(12) United States Patent  (10) Patent No.: US 9,204,626 B2
Vitali et al.  (45) Date of Patent: Dec. 8, 2015

(54) METHOD AND SYSTEM FOR CONTROLLING AN INCLINATION OF A BOOM CARRIED BY A VEHICLE

(71) Applicant: MS GREGSON, Drummondville (CA)

(72) Inventors: Mario Vitali, Drummondville (CA); Guy Martel, St-Lucien (CA); Remi Lagace, Drummondville (CA); Mamadou Diallo, Drummondville (CA)

(73) Assignee: MS GREGSON, Drummondville, Quebec (CA)

( * ) Notice: Subject to any disclaimer, the term of this patent is extended or adjusted under 35 U.S.C. 154(b) by 0 days.

(21) Appl. No.: 14/152,656

(22) Filed: Jan. 10, 2014

(65) Prior Publication Data

US 2015/0112554 A1    Apr. 23, 2015

Related U.S. Application Data

(60) Provisional application No. 61/894,842, filed on Oct. 23, 2013.

(51) Int. Cl.
*A01M 7/00* (2006.01)
*F16M 13/04* (2006.01)

(52) U.S. Cl.
CPC ............ *A01M 7/0057* (2013.01); *F16M 13/04* (2013.01)

(58) Field of Classification Search
CPC ... A01B 69/008; A01B 79/005; E02F 9/2025; E02F 9/2045; E02F 9/26; F16M 13/04; A01M 7/0057
USPC .......................................................... 701/50
See application file for complete search history.

(56) References Cited

U.S. PATENT DOCUMENTS

| 4,344,572 | A  | * | 8/1982 | Tyler | 239/168 |
|---|---|---|---|---|---|
| 6,618,659 | B1 | * | 9/2003 | Berger et al. | 701/50 |
| 7,657,355 | B2 | * | 2/2010 | Rau et al. | 701/50 |
| 8,447,477 | B2 | * | 5/2013 | Harada et al. | 701/50 |
| 2005/0011190 | A1 | * | 1/2005 | Bitter | 60/468 |
| 2006/0118653 | A1 | * | 6/2006 | Shivak | 239/166 |
| 2008/0088107 | A1 | * | 4/2008 | Bitter | 280/124.161 |
| 2008/0100017 | A1 | * | 5/2008 | Bitter | 280/124.16 |
| 2008/0104953 | A1 | * | 5/2008 | Vigholm | 60/413 |
| 2008/0162005 | A1 | * | 7/2008 | Tang et al. | 701/50 |
| 2009/0029826 | A1 | * | 1/2009 | Eguchi et al. | 477/39 |
| 2009/0211435 | A1 | * | 8/2009 | Yi et al. | 91/361 |
| 2009/0272551 | A1 | * | 11/2009 | Thompson et al. | 172/284 |

(Continued)

FOREIGN PATENT DOCUMENTS

| CA | 2293552 A1 | 10/1999 |
|---|---|---|
| CA | 2570764 C | 12/2007 |

*Primary Examiner* — Mary Cheung
*Assistant Examiner* — Atul Trivedi (57) ABSTRACT

The present relates to a method and system for controlling an inclination of a boom with respect to a vehicle. A central frame member allows a pivotal movement of the boom with respect to the vehicle. Sensors collect data related to an inclination of the central frame member with respect to the vehicle. Control means control the inclination of the central frame member with respect to the vehicle. An electronic control unit actuates the control means based on the collected data. The control means may comprise breaking means for preventing a variation of the inclination of the central frame member, and adjustment means for modifying the inclination of the central frame member.

20 Claims, 7 Drawing Sheets

(56) References Cited

U.S. PATENT DOCUMENTS

| | | | |
|---|---|---|---|
| 2009/0292427 A1* | 11/2009 | Yamada et al. | 701/50 |
| 2011/0150614 A1* | 6/2011 | Nicholson et al. | 414/685 |
| 2011/0301781 A1* | 12/2011 | Karlsson et al. | 701/1 |
| 2011/0318155 A1* | 12/2011 | Okamura et al. | 414/685 |
| 2011/0318157 A1* | 12/2011 | Okamura et al. | 414/687 |
| 2012/0004816 A1* | 1/2012 | Okamura et al. | 701/50 |
| 2012/0067432 A1* | 3/2012 | Vigholm et al. | 137/14 |
| 2013/0004282 A1* | 1/2013 | Grimes et al. | 414/698 |

* cited by examiner

METHOD AND SYSTEM FOR CONTROLLING AN INCLINATION OF A BOOM CARRIED BY A VEHICLE

TECHNICAL FIELD

The present disclosure relates to a boom carried by a vehicle, and more particularly to a method and system for controlling an inclination of the boom with respect to the vehicle.

BACKGROUND

Figure 1:
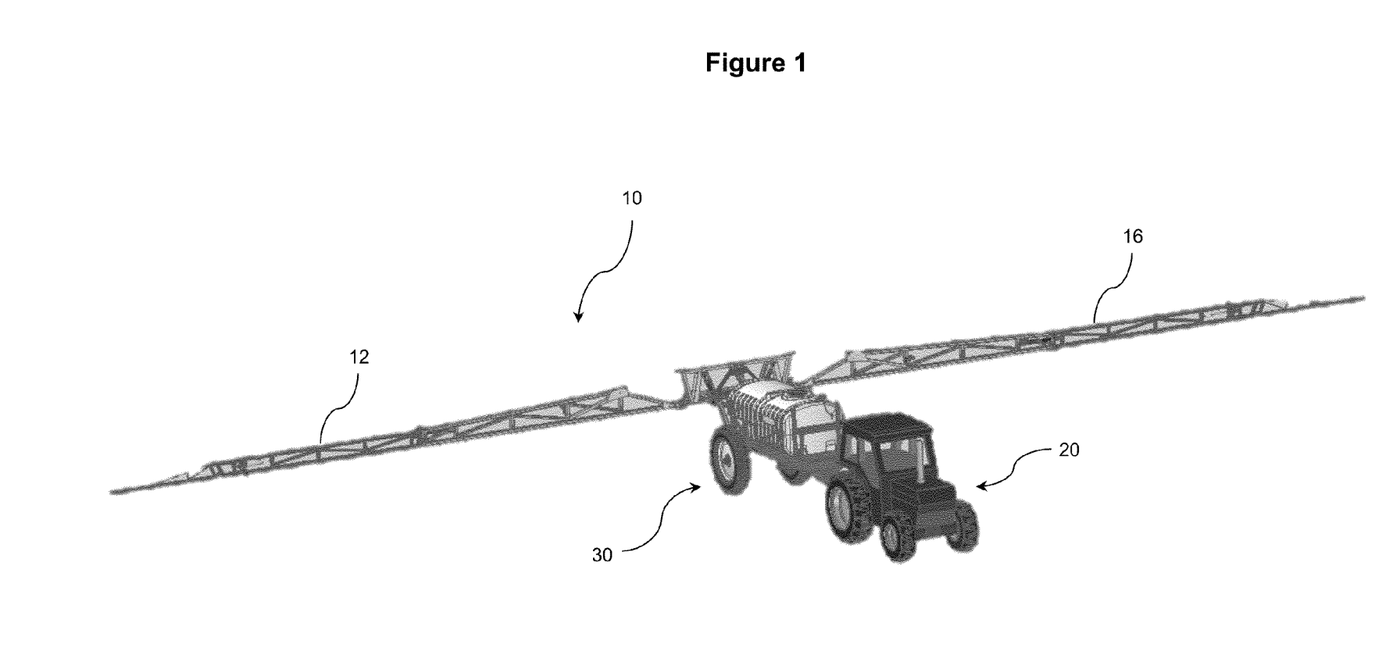
FIG. 1 illustrates a perspective view of a boom and a vehicle carrying the boom.

The usage of a boom carried by a vehicle may occur in different domains. For example, in the agricultural domain, a tractor carrying a boom may be used to spray a liquid or a gas (e.g. water, fertilizer, insecticide) in a field. FIG. 1 illustrates such a boom 10, having two sections 12 and 16 extending on each side of a tractor 20 to cover a large area; each section 12 and 16 being capable of spraying the liquid or the gaz. The boom 10 may be directly carried by the tractor 20. Alternatively, as illustrated in FIG. 1, the boom 10 may be carried by a towed vehicle 30 attached to the tractor 20. The towed vehicle 30 supports a tank containing the liquid or the gas to be spread by the boom 10.

The boom is generally not rigidly fixed to the carrying vehicle, but may move rotationally around a longitudinal axis, located at a center of the boom and perpendicular to the length of the boom. Thus, when the carrying vehicle is driving on an inclined ground or on a generally plane ground with random irregularities, the rotational movement of the boom may contribute to maintain a global balance of the carrying vehicle and the boom. A rigidly fixed boom may lead to a partial overturn of the carrying vehicle or may cause damages to the boom; while a rotationally fixed boom contributes to attenuating the impact of the profile of the ground on the stability of the carrying vehicle and the boom. The global balance of the carrying vehicle and the boom is affected, because the orientation of the boom with respect to the ground is directed by gravity, while the orientation of the carrying vehicle with respect to the ground is directed by the profile of the ground.

Additionally, each section of the boom may be independently moved vertically (adjustment of the height of a section with respect to the ground) or extended horizontally, in order to adapt to specific conditions of use or to a specific profile of the ground. Such a vertical movement of one of the sections may modify the global balance of the boom, and trigger a rotation of the boom around its axis.

Figure 2A:
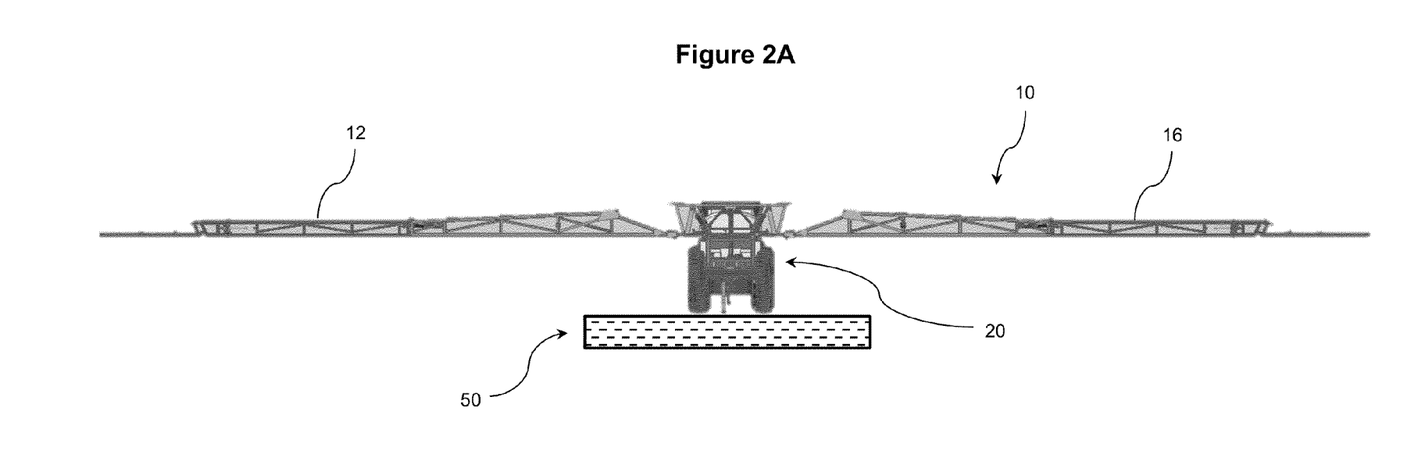
FIGS. 2A and 2B illustrate a front view of a boom and a vehicle carrying the boom in an optimal configuration.
Figure 2B:
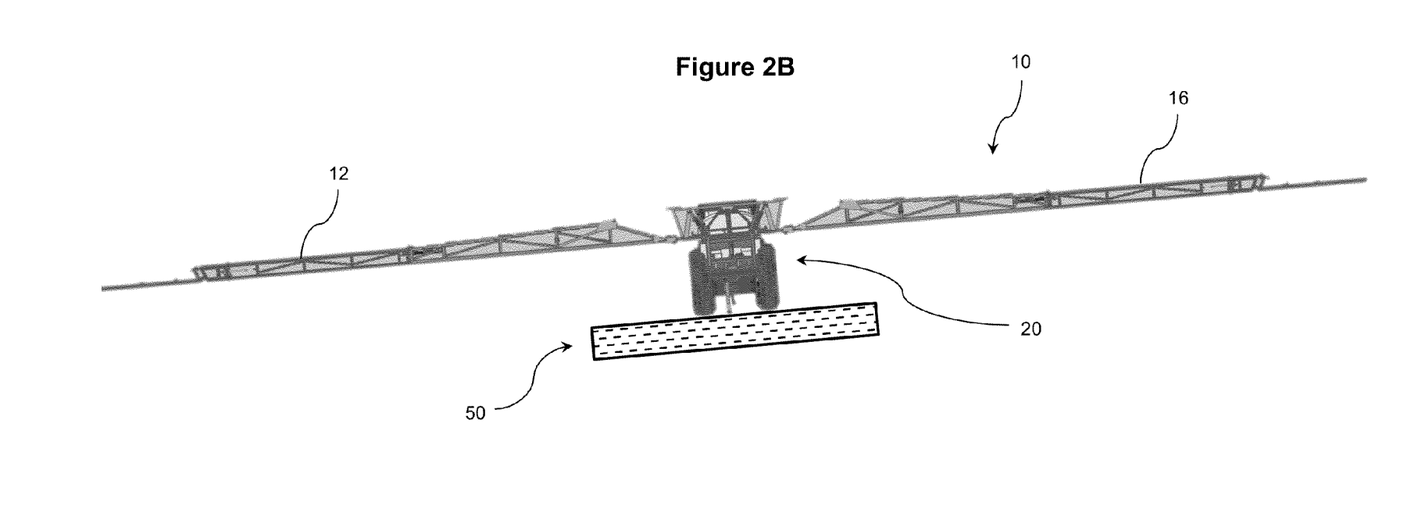
Figure 3:
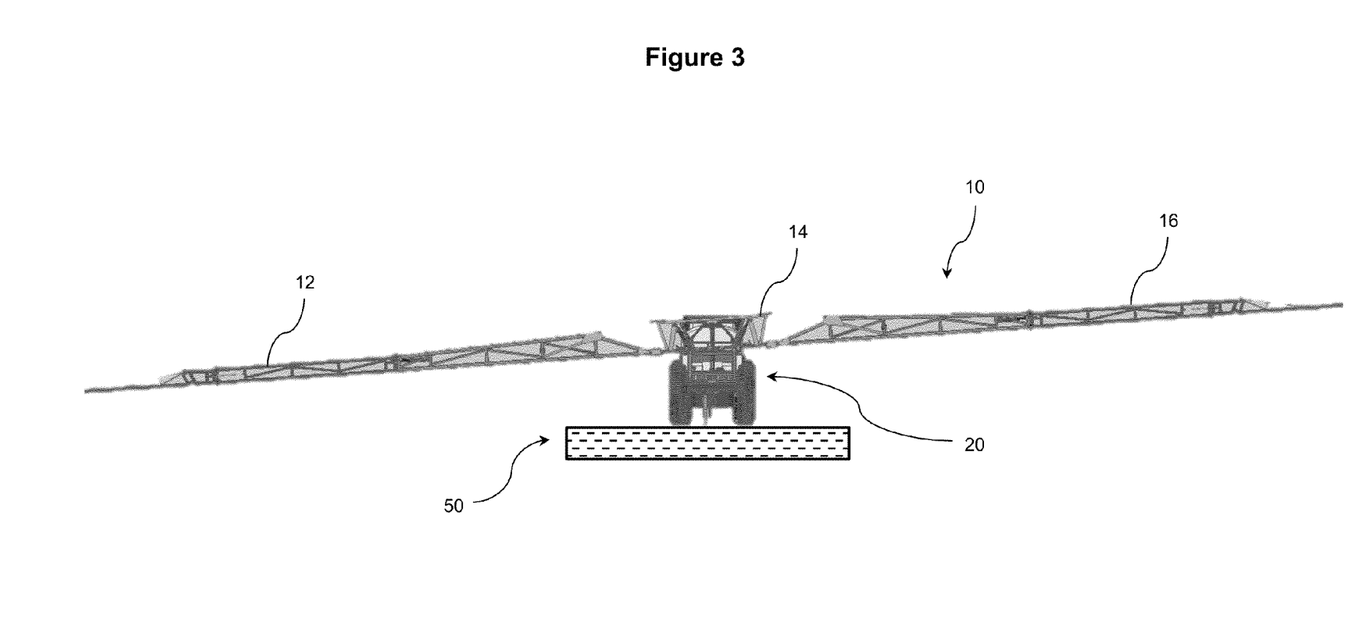
FIG. 3 illustrates a front view of a boom and a vehicle carrying the boom in a non-optimal configuration.

An optimal configuration for operating the boom is when the boom and the carrying vehicle have the same orientation, namely when they are both horizontally aligned with the ground. FIG. 2A illustrates the optimal configuration, where the boom 10 and the carrying vehicle 20 are both horizontally aligned with the ground 50. FIG. 2B illustrates another case, where the optimal configuration is maintained, although the ground 50 is not horizontal. FIG. 3 illustrates a non-optimal configuration, where the boom 10 is not horizontally aligned with the ground 50. In this case, the inclination of the boom 10 shall be corrected, to obtain the optimal configuration illustrated in FIG. 2A.

However, in specific circumstances, the configuration illustrated in FIG. 3 shall be maintained for a certain amount of time, before reverting to the optimal configuration of FIG. 2A. For example, the vertical movement of one of the sections 12 or 16 of the boom 10 may lead to the non-optimal configuration of FIG. 3. Specifically, the difference of height between the two sections 12 and 16 modifies the global balance of the boom 10 and triggers a rotation of the boom 10 around its axis, leading to the non-optimal configuration of FIG. 3. However, trying to correct the inclination of the boom 10 during the vertical movement of the section 12 or 16 may lead to a series of uncontrollable actions/reactions. Therefore, it is more efficient (and eventually safer) not to act on the inclination of the boom 10 during the vertical movement of the section 12 or 16, and to correct the non-optimal inclination afterwards.

There is therefore a need for a method and system for controlling an inclination of a boom with respect to a vehicle carrying the boom.

SUMMARY

According to a first aspect, the present disclosure provides a method for controlling an inclination of a boom with respect to a vehicle carrying the boom. The method comprises allowing a pivotal movement of the boom with respect to the vehicle. The method also comprises collecting data related to an inclination of the boom with respect to the vehicle. The method further comprises processing the collected data by means of an electronic control unit to generate commands for actuating control means. The method also comprises actuating the control means for controlling the inclination of the boom with respect to the vehicle.

According to another aspect, the present disclosure provides a system for controlling an inclination of a boom with respect to a vehicle. The system comprises a central frame member located in the vicinity of a center of the boom and pivotally mounted to the vehicle. The system also comprises at least one sensor for collecting data related to an inclination of the central frame member with respect to the vehicle. The system further comprises control means for controlling the inclination of the central frame member with respect to the vehicle. The system also comprises an electronic control unit for actuating the control means based on the collected data.

In a particular aspect, the control means may comprise breaking means for preventing a variation of the inclination of the central frame member, and adjustment means for modifying the inclination of the central frame member.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the control of an inclination of a boom with respect to a vehicle carrying the boom.

TERMINOLOGY

The following terminology is used throughout the present disclosure:

Auto-leveling: the action of modifying the inclination of the boom with respect to the carrying vehicle. The objective of the auto-leveling is to reach an optimal configuration where the boom and the carrying vehicle are both aligned with the ground.

Natural leveling: allowing free variations of the inclination of the boom with respect to the carrying vehicle. Following auto-leveling, the optimal configuration is reached and natural leveling is allowed to smoothly absorb irregularities in the ground; until another auto-leveling action is required.

Auto-break: the action of preventing the modification of the inclination of the boom with respect to the carrying vehicle. The objective of the auto-break is to avoid interferences with other operations (e.g. auto-adjustment) affecting the orientation of the boom, therefore preventing an uncontrolled cycle of actions/reactions.

Auto-adjustment: the action of adjusting the height of a section of the boom by a vertical movement of this section. Each section may be adjusted individually. The auto-adjustment generally triggers a modification of the inclination of the boom with respect to the carrying vehicle, due to a modification of the global balance of the boom.

Reference is now made to FIGS. 3, 4, 5, 6 and 7 concurrently, which illustrate a method and system for controlling the inclination of a boom carried by a vehicle.

FIG. 3 illustrates a boom 10, having two sections 12 and 16 extending on each side of a vehicle 20. The boom 10 is carried by the vehicle 20. The boom 10 comprises a central frame member 14, by which the boom 10 is pivotally connected to the vehicle 20. The pivotal connection between the boom 10 and the vehicle 20 allows a modification of the inclination of the boom 10 with respect to the vehicle 20. The central frame member 14 is located at a center of the boom 10, and each section 12 and 16 is respectively secured to the central frame member 14 at one of its opposite extremities.

The inclination of the boom 10 with respect to the vehicle 20 may change due to various conditions of operation of the boom 10. The inclination of the boom 10 with respect to the vehicle 20 may be modified (to perform an auto-levelling) and/or prevented from being modified, by appropriate control means. Additionally, the height of each section 12 and 16 may be independently modified by appropriate means, to perform an auto-adjustment.

Figure 7:
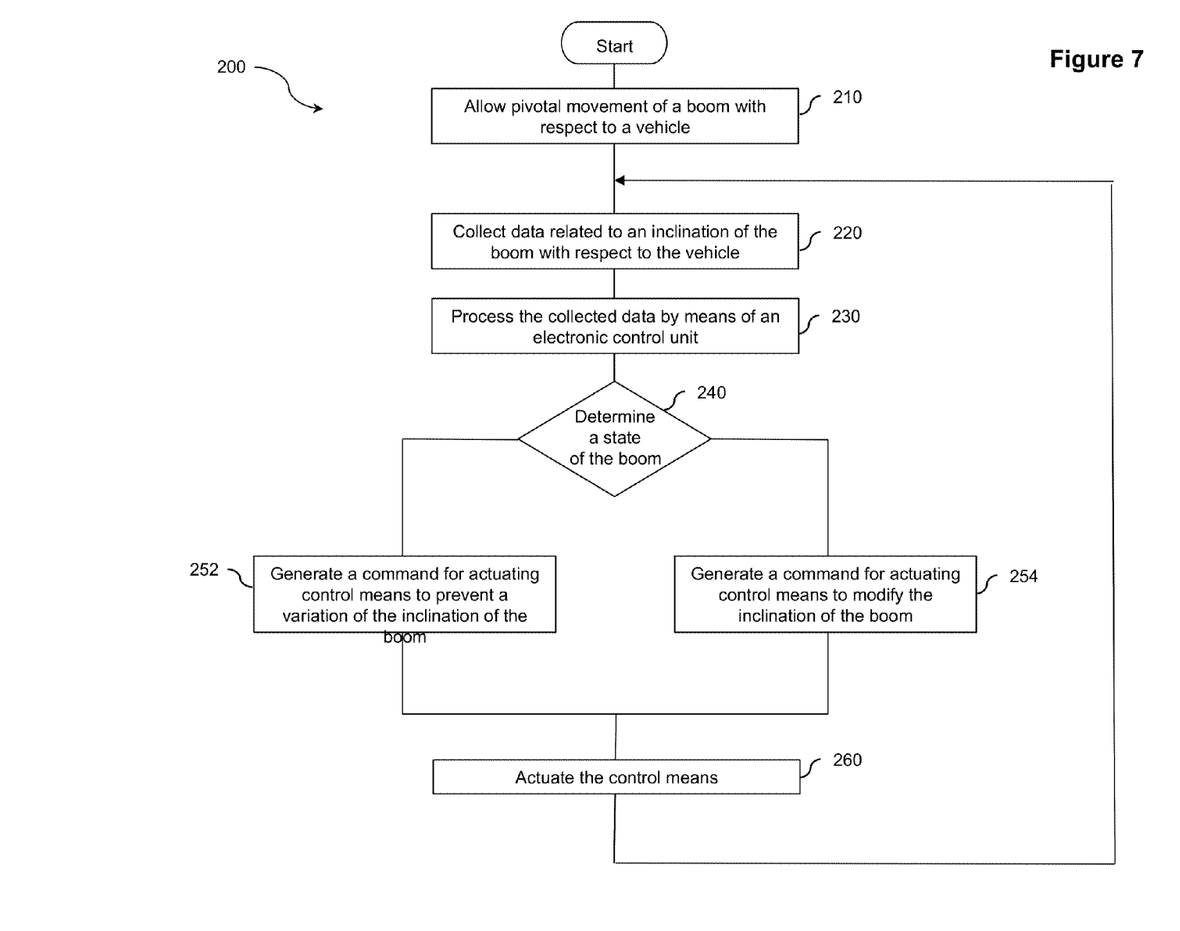
FIG. 7 illustrates a method for controlling an inclination of a boom with respect to a vehicle carrying the boom, according to a non-restrictive illustrative embodiment.

FIG. 7 illustrates a method 200 for controlling the inclination of the boom 10 with respect to the vehicle 20.

The method starts with allowing 210 pivotal movement of the boom 10 with respect to the vehicle 20.

The method pursues with collecting 220 data related to an inclination of the boom 10 with respect to the vehicle 20.

The method continues with processing 230 the collected data by means of an electronic control unit.

The method may include a step 240 of determining a state of the boom 10, based on the processing of the collected data.

The method then continues with generating commands for actuating control means. For instance, based on the state of the boom 10, the method may generate 252 a command for actuating control means to prevent a variation of the inclination of the boom 10. The method may also generate 254 a command for actuating control means to modify the inclination of the boom 10. Various embodiments of the method may include only preventing a variation of the inclination of the boom 10 based on the state, only modifying the inclination of the boom 10 based on the state, or both.

The method pursues with actuating 260 the control means. Then, the method goes back to step 220, to collect new data related to the inclination of the boom 10 with respect to the vehicle 20. The collection 220 of the data may occur at regular time intervals, different types of data may be collected with different time intervals, specific data may be collected asynchronously. The processing 230 of the collected data may be performed at regular time intervals, or every time a new data has been collected.

FIGS. 3, 4, 5 and 6 illustrate a system for controlling the inclination of the boom 10 with respect to the vehicle 20.

Figure 4:
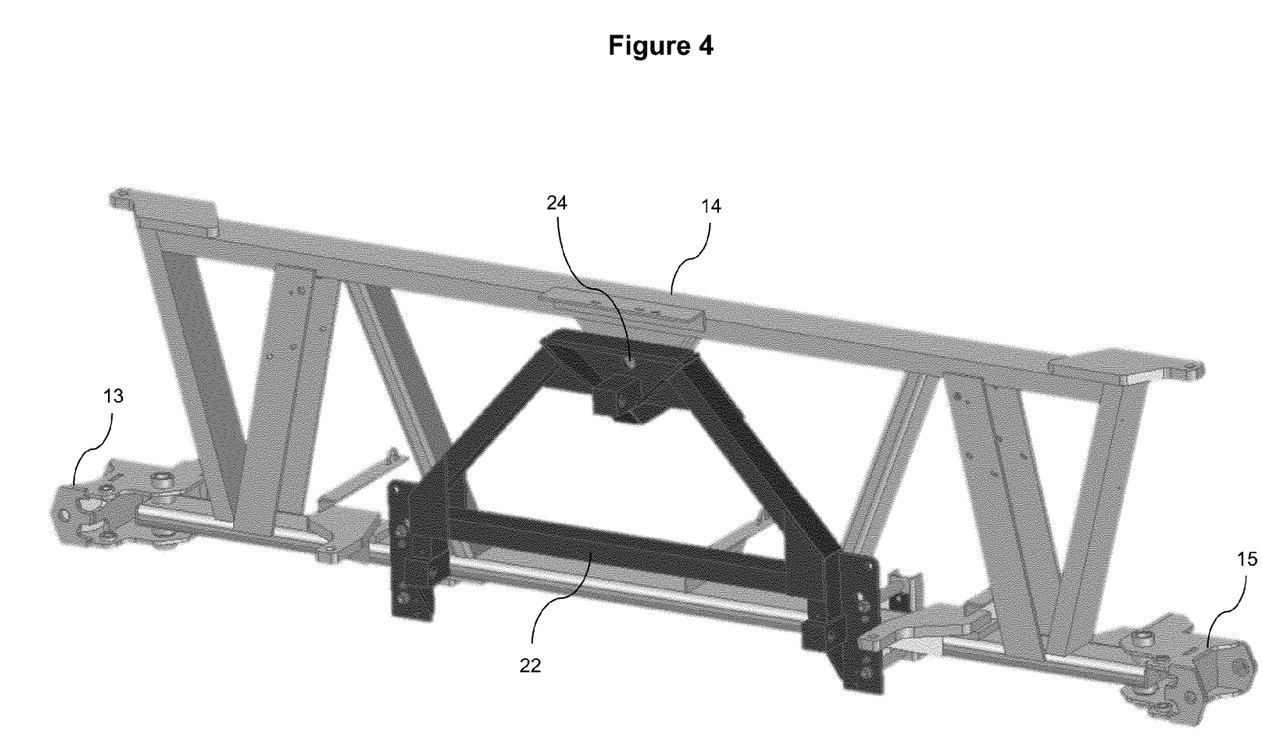
FIG. 4 illustrates a perspective view of a central frame member of a boom and a frame member attached to a vehicle carrying the boom, according to a non-restrictive illustrative embodiment.

The system comprises the central frame member 14, located at the center of the boom 10 and pivotally connected to the vehicle 20. The central frame member 14 represented in FIG. 4 is for illustration purposes only, and may vary in shape, size and structural design. The sections 12 and 16 of the boom 10 may be secured to extremities 13 and 15 of the central frame member 14 by any appropriate securing mechanism. Alternately, the sections 12 and 16 of the boom 10 may be secured to one or several opposite points of the central frame member 14, although not specifically shown on FIGS. 4 and 5.

The system also comprises at least one sensor for collecting data related to a direct or ultimate inclination of the central frame member 14 with respect to the vehicle 20. For illustrations purposes, two sensors 110 and 120 have been represented in FIG. 6 for collecting data related to the direct or ultimate inclination. However, the number of sensors may vary, depending on the quantity and type of data which may be collected. The sensors 110 and 120 may be respectively located on the central frame member 14 and on the vehicle frame member 22, to determine an inclination of the boom 10 with respect to the vehicle 20. In a particular aspect, at least one additional sensor collects data allowing a determination that an auto-adjustment of the boom is occurring. For illustrations purposes, two sensors 130 and 140 for monitoring the auto-adjustment of the boom 10 have been represented in FIG. 6. These sensors may be located along section 12 (e.g. sensor 3) and section 16 (e.g. sensor 4), and are capable of determining the height of sections 12 and 14. The sensors could consist for example of one or several of the following: gyroscopes, clinometers, horizontal level sensors, vertical level sensors, electronic levels, liquid level sensors; or any other type of sensor adapted to detect a modification of the inclination of the boom 10 with respect to the vehicle 20 or a modification of the heights of sections 12 and 16.

Figure 6:
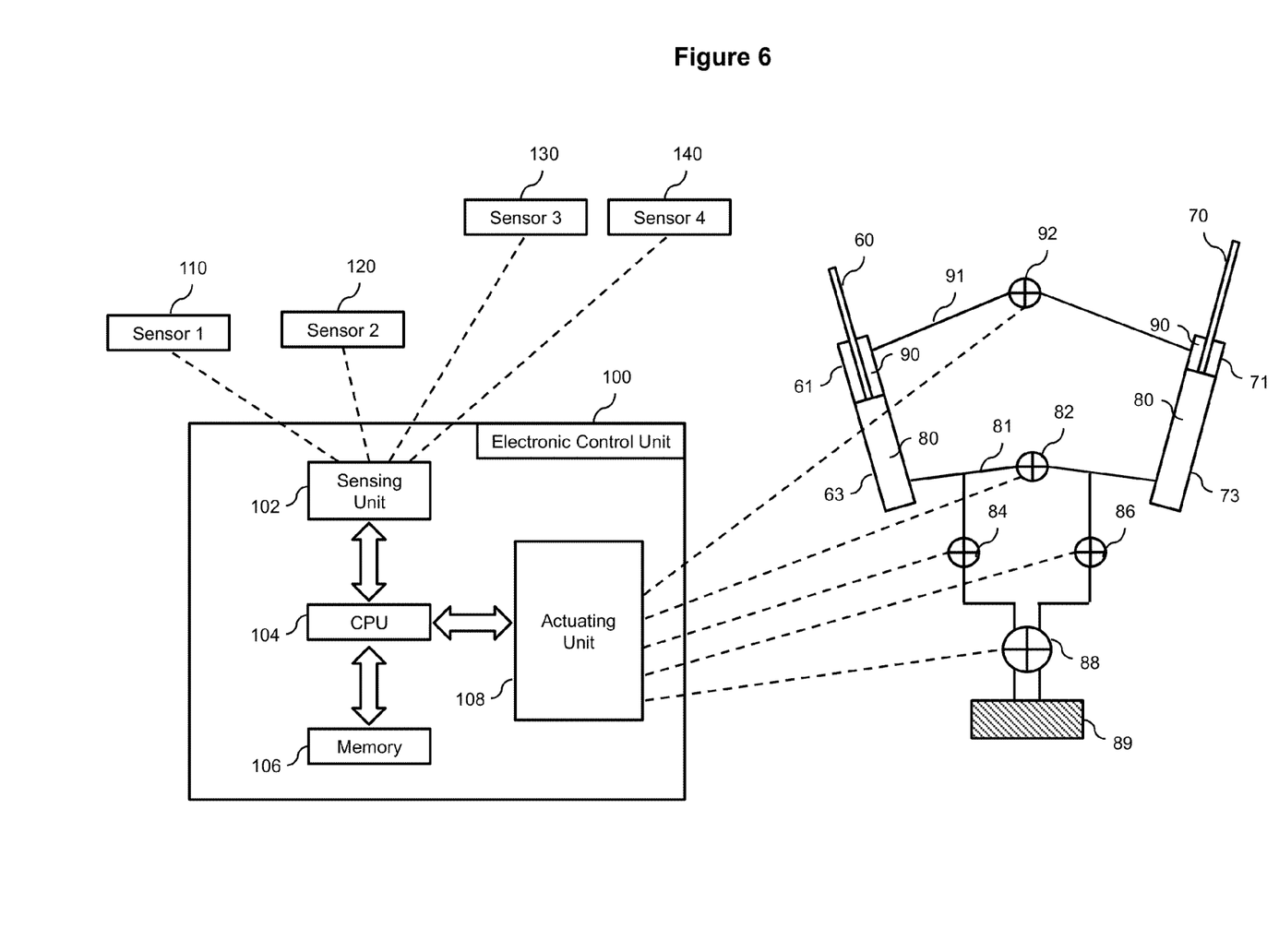
FIG. 6 illustrates a system for controlling an inclination of a boom with respect to a vehicle carrying the boom, according to a non-restrictive illustrative embodiment.

The system further comprises control means for controlling the inclination of the central frame member 14 with respect to the vehicle 20. For instance, the system may comprise breaking means to prevent a variation of the inclination of the central frame member 14 with respect to the vehicle 20. The system may also comprise adjustment means to modify the inclination of the central frame member 14 with respect to the vehicle 20. Various embodiments of the system may include only breaking means, only adjustment means, or both.

The system also comprises an electronic control unit 100 for actuating the control means based on the collected data. The data collected by the sensors (e.g. 110, 120, 130 and 140)

are transmitted to the electronic control unit 100, where they are processed to generate commands to actuate the control means. The commands are transmitted to the control means for effectively actuating the control means. The actuation of the control means may result in one of: preventing a variation of the inclination of the central frame member 14, or modifying the inclination of the central frame member 14.

In a particular aspect, the vehicle 20 comprises a frame member 22. The central frame member 14 and the vehicle frame member 22 are pivotally connected one to another. The vehicle frame member 22 represented in FIG. 4 is for illustration purposes only, and may vary in shape, size and structural design. The pivotal connection may be provided by a pivot 24, which allows an inclination of the central frame member 14 (and subsequently of the boom 10) independently of the vehicle frame member 22 (and subsequently of the vehicle 20).

Figure 5:
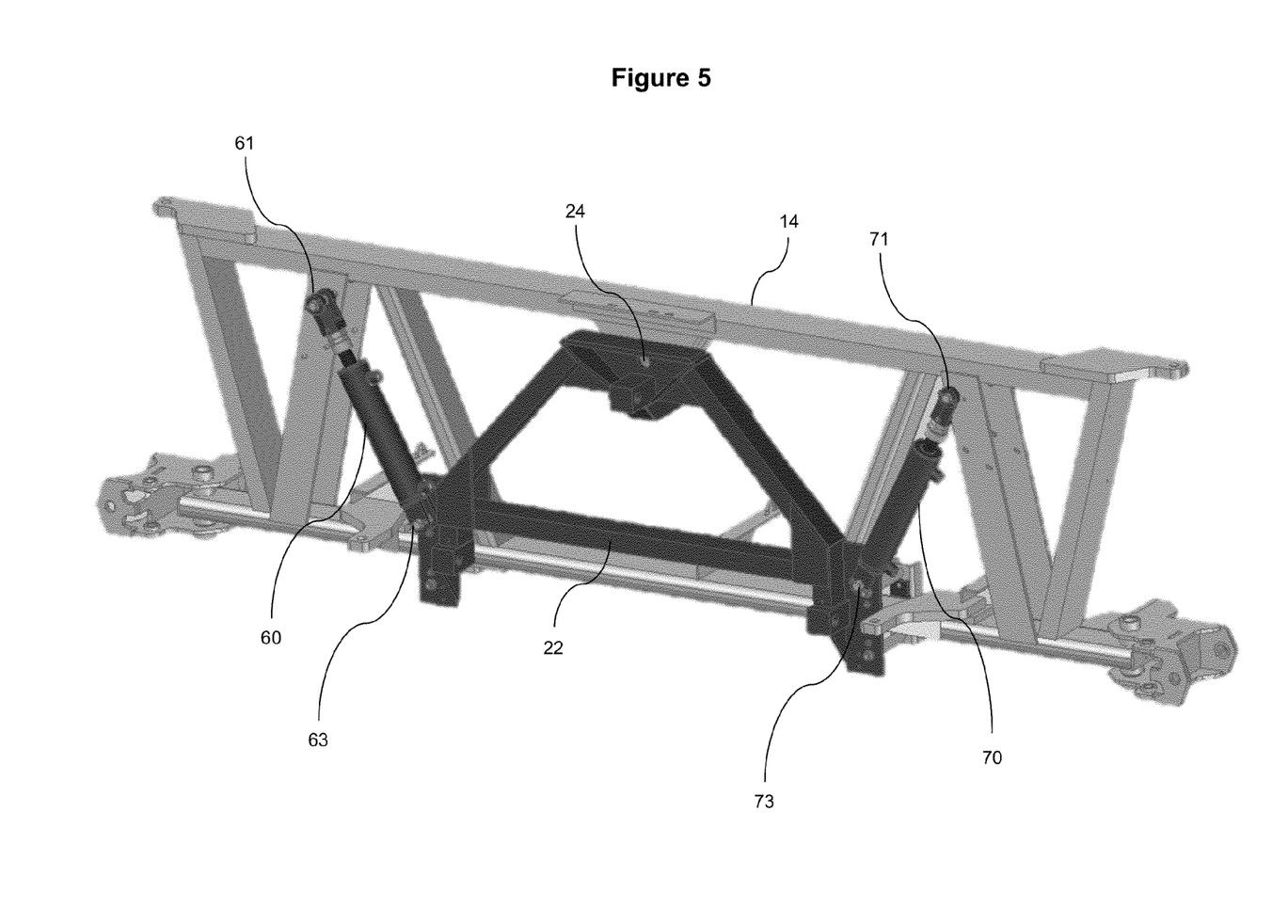
FIG. 5 illustrates a perspective view of the frames of FIG. 4 with a pair of hydraulic cylinders secured to the frames, according to a non-restrictive illustrative embodiment.

The adjustment means may comprise a pair of hydraulic cylinders 60 and 70 illustrated in FIG. 5. In a particular aspect, each hydraulic cylinder 60, 70 has an upper extremity 61, 71 secured to the central frame member 14 and a lower extremity 63, 73 secured to the vehicle frame member 22. An actuation of at least one of the hydraulic cylinders 60, 70 causes a modification of the inclination of the central frame member 14 (and subsequently of the boom 10) with respect to the vehicle frame member 22 (and subsequently with respect to the vehicle 20). In a particular embodiment, the extension of each hydraulic cylinder 60, 70 is controlled by a level of fluid which circulates between the hydraulic cylinders 60 and 70, allowing a simultaneous control of both hydraulic cylinders 60 and 70, as is further illustrated in the following.

In another particular aspect illustrated in FIG. 6, the lower extremities 63, 73 of the hydraulic cylinders 60, 70 contain a fluid 80. A modification of the quantity of fluid 80 in one of the hydraulic cylinders 60, 70 modifies its extension. The modification of the extension results in a modification of the inclination of the central frame member 14 (and subsequently of the boom 10). The fluid 80 may consist of oil, or of any other suitable liquid or gaz.

Alternately or complementarily, the fluid 80 may circulate from one lower extremity (e.g. 63) to the other lower extremity (e.g. 73). The circulation of the fluid 80 modifies the extension of the hydraulic cylinders 60, 70, which results in a modification of the inclination of the central frame member 14 (natural leveling). Natural leveling is authorized in any specific predetermined condition taken solely or in combination: horizontal ground, sections 12 and 16 in a horizontal position, certain range(s), certain range for a certain period of time, during certain event(s) such as for example turning of the vehicle 20, parking of the vehicle 20, rearing of the vehicle 20 etc., Natural leveling is authorized until the inclination of the central frame member 14 with respect to the vehicle frame member 22 becomes unacceptable (auto-leveling is required). The circulation of the fluid 80 may be performed by means of a pipe 81 joining the lower extremities 63 and 73. For example, as illustrated in FIG. 6, the quantity of fluid 80 present in extremity 73 is higher than in extremity 63, due to a circulation from extremity 63 to extremity 73. Additionally, a valve 82 may be used to allow/prevent the circulation of the fluid 80 between the lower extremities 63 and 73. The valve 82 is controlled by the electronic control unit 100. Based on the data received from the sensors (e.g. 110, 120, 130 and 140), the electronic control unit 100 determines whether to generate commands to open/close the valve 82. The opening of the valve 82 actuates the hydraulic cylinders 60, 70, by allowing the fluid 80 to circulate between the lower extremities 63 and 73.

In another embodiment, the quantity of fluid 80 in the lower extremity 63, 73 of each hydraulic cylinder 60, 80 may be independently modified (add or remove some fluid 80). The modification of the quantity of fluid 80 modifies the extension of the hydraulic cylinders 60, 70, which results in a modification of the inclination of the central frame member 14 (auto-leveling). For example, as illustrated in FIG. 6, the quantity of fluid 80 present in extremity 73 is higher than in extremity 63, due to a removal of fluid 80 in extremity 63 and an addition of fluid 80 in extremity 73. Additionally, at least one valve per hydraulic cylinder 60, 70 may be used to independently control the quantity of fluid 80 in the lower extremity 63, 73 of each hydraulic cylinder 60, 70. The at least one valve is controlled by the electronic control unit 100. For illustration purposes, FIG. 6 represents a first valve 84 for independently controlling the quantity of fluid 80 in the lower extremity 63 and a second valve 86 for independently controlling the quantity of fluid 80 in the lower extremity 73. Additionally, a proportional valve 88 connected to a supply of fluid 89 is capable of adding fluid to/removing fluid from one of the lower extremities 63 and 73. Based on the data received from the sensors (e.g. 110, 120, 130 and 140), the electronic control unit 100 determines whether to generate commands to actuate valves 84, 86 and 88. For instance, to remove fluid from the lower extremity 63, the electronic control unit 100 generates commands to open valve 84, to actuate proportional valve 88 in the proper mode (removal of fluid 80), to close valves 88 and 84 when the adequate quantity of fluid 80 has been removed from the lower extremity 63. Similarly, to add fluid to the lower extremity 73, the electronic control unit 100 generates commands to open valve 86, to actuate proportional valve 88 in the proper mode (addition of fluid 80), to close valves 88 and 86 when the adequate quantity of fluid 80 has been added to the lower extremity 73. The actuation of the valves 84 and 88 actuates in turn the hydraulic cylinder 60, by modifying the quantity of fluid 80 present in the lower extremity 63. The actuation of the valves 86 and 88 actuates in turn the hydraulic cylinder 70, by modifying the quantity of fluid 80 present in the lower extremity 73.

The system may comprise only the mechanism for allowing the circulation of the fluid 80 between the lower extremities 63 and 73, only the mechanism for independently modifying the quantity of fluid 80 present in the lower extremities 63 and 73, or a combination of both. The electronic control unit 100 actuates both mechanisms. In a preferred embodiment, both mechanisms are present and the electronic control unit 100 coordinates the operations of the two mechanisms when they are both present. During auto-leveling, valve 82 is closed and some of valves 84, 86 and 88 are opened. During natural leveling, valve 82 is opened and valves 84, 86 and 88 are closed.

In still another particular aspect illustrated in FIG. 6, which may be used independently or concurrently with one or both of the mechanisms for allowing the circulation of the fluid 80, the upper extremities 61, 71 of the hydraulic cylinders 60, 70 may contain a fluid 90. A modification of the quantity of fluid 90 in one of the hydraulic cylinders 60, 70 modifies its extension. The modification of the extension results in a modification of the inclination of the central frame member 14 (and subsequently of the boom 10). The fluid 90 may consist of oil or of any appropriate liquid or gaz. In a preferred embodiment, the two mechanisms for allowing the circulation of the fluid 80 and the mechanism for allowing the circulation of the fluid 90 are all present; and the electronic control unit 100 coordinates the operations of the various mechanisms.

In an embodiment, the fluid 90 may circulate from one upper extremity (e.g. 61) to the other upper extremity (e.g.

71). The circulation of the fluid 90 allows a modification of the extension of the hydraulic cylinders 60, 70, which results in a modification of the inclination of the central frame member 14 (auto-leveling or natural leveling). The circulation of the fluid 90 may be performed by means of a pipe 91 joining the upper extremities 61 and 71. For example, as illustrated in FIG. 6, the quantity of fluid 90 present in extremity 61 is higher than in extremity 71, due to a circulation from extremity 71 to extremity 61. Additionally, a valve 92 may be used to allow/prevent the circulation of the fluid 90 between the upper extremities 61 and 71. The valve 92 is controlled by the electronic control unit 100. Based on the data received from the sensors (e.g. 110, 120, 130 and 140), the electronic control unit 100 determines whether to generate commands to open/close the valve 92. The closing of the valve 92 blocks the hydraulic cylinders 60, 70, by preventing the fluid 90 to circulate between the upper extremities 61 and 71. Consequently, a modification of the inclination of the central frame member 14 is prevented (auto-break). For example, if the electronic control device 100 determines (e.g. via one of the sensors 130 and 140) that an auto-adjustment is occurring, it may close valve 92 to prevent a modification of the inclination of the central frame member 14 (and subsequently of the boom 10) during auto-adjustment. The pipes 81 and 91 are schematically represented in FIG. 6 as an inverted V-shape for simplification purposes of the drawing only, but not to represent a mechanical implementation. Depending on the implementation, the pipes 81 and 91 could be parallel, V-shaped, inverted V-shapes, or a combination thereof.

The auto-break functionality could also be implemented via a disc break, instead of the valve 92 for controlling the circulation of the fluid 90 between the upper extremities 61 and 71.

The electronic control unit 100 controls and coordinates the various operations of the boom 10 (auto-leveling, auto-break and auto-adjustment) based on the information received from the sensors (e.g. 110, 120, 130 and 140). During auto-adjustment, auto-break may be applied: the valve 92 is closed to prevent a modification of the inclination of the boom 10. Auto-break is applied during auto-adjustment only if pre-determined conditions (which may trigger an uncontrolled cycle of actions/reactions) are reached. The information received from the sensors allow a determination of whether these pre-determined conditions are reached. The duration of the closure of the valve 92 is generally short, and does not last during the whole auto-adjustment phase. When the pre-determined conditions are no longer occurring, the valve 92 is re-opened to allow a modification of the inclination of the boom 10. However, when auto-levelling is occurring, auto-break is not applied even if auto-adjustment is occurring. Thus, auto-break is applied when natural leveling occurs, but not when auto-leveling occurs. During auto-leveling, valve 82 is closed and valves 84, 86, 88 are actuated to modify the inclination of the boom 10. When auto-levelling is terminated, valves 84, 86, 88 are closed, and valve 82 remains closed during a transition phase corresponding to the interval between two measurements of the inclination. Following the transition phase, a verification phase is performed. The verification phase consists in partially opening the valve 82 to allow a limited quantity of fluid 80 to circulate between the lower extremities 63 and 73, in order to perform the measurement of the inclination. If the inclination of the central frame member 14 with respect to the vehicle frame member 22 is over a pre-determined threshold, the valve 82 is closed and auto-leveling is performed again. If the inclination of the central frame member 14 with respect to the vehicle frame member 22 is bellow the pre-determined threshold, the valve 82 is fully opened to allow natural leveling. During natural-leveling, if the inclination of the central frame member 14 with respect to the vehicle frame member 22 reaches the pre-determined threshold, auto-leveling is started.

Following is a summary of the phases and corresponding operations performed by the electronic control unit 100, with respect to the various valves, based on the information collected by the sensors.

|  | Auto-adjustment | No auto-adjustment |
|---|---|---|
| Natural leveling | Valve 92 closed (auto-break) Valve 82 opened Valves 84, 86, 88 closed | Valve 92 opened (no auto-break) Valve 82 opened Valves 84, 86, 88 closed |
| Auto-leveling | Valve 92 opened (no auto-break) Valve 82 closed Valves 84, 86, 88 opened | Valve 92 opened (no auto-break) Valve 82 closed Valves 84, 86, 88 opened |
| Transition phase | Valve 92 opened (no auto-break) Valve 82 closed Valves 84, 86, 88 closed | Valve 92 opened (no auto-break) Valve 82 closed Valves 84, 86, 88 closed |
| Verification phase | Valve 92 opened (no auto-break) Valve 82 partially opened Valves 84, 86, 88 closed | Valve 92 opened (no auto-break) Valve 82 partially opened Valves 84, 86, 88 closed |

In an alternative embodiment (not represented in the Figures), the adjustment means may comprise a double rod hydraulic cylinder instead of the pair of hydraulic cylinders 60 and 70 represented in FIG. 5. The breaking means may comprise at least one valve for controlling a quantity of fluid in the double rod hydraulic cylinder.

Turning now more particularly to FIG. 6, this Figure illustrates an exemplary implementation of the electronic control unit 100. The electronic control unit 100 comprises a sensing unit 102 connected by means of wires or wirelessly to one or more sensors (e.g. 110, 120, 130 and 140). The sensing unit 102 is capable of receiving directly or ultimately data related to an inclination of the boom 10 with respect to the vehicle 20 (e.g. from sensors 110 and 120), and data related to an effective height of each section 12 and 14 of the boom 10 (e.g. from sensors 130 and 140). The electronic control unit 100 also comprises at least one Central Processing Unit (CPU) 104 for processing the received data and generating commands for actuating the control means. The CPU 104 executes at least one dedicated software capable of processing the received data and generating the commands. The electronic control unit 100 further comprises an actuating unit 108 for transmitting the commands to the actuating means (e.g. valves 82, 84, 86, 88 and 92) for controlling the auto-leveling, the auto-break and the auto-adjustment. The electronic control unit 100 may comprise a memory 106 for storing: the collected data, a current state of the boom 10 determined based on the collected data, and the dedicated software executed by the CPU 104.

The electronic control unit 100 may also comprise a Global Positioning System (GPS) unit (not represented in FIG. 6). The GPS unit is used to determine the coordinates of the vehicle carrying the boom. The GPS unit is also used to calculate the speed of the vehicle carrying the boom. The CPU 104 calculates the speed based on the determined coordinates, and uses the calculated speed as an additional parameter (in addition to the data received by the sensing unit 102) for generating the commands.

A system for performing the auto-adjustment of the boom 10 may comprise ultrasonic probes for measuring an effective height of each section 12 and 14 of the boom. Several ultrasonic probes may be distributed on the sections 12 and 14. A calculator determines a correction of the effective height based on a target height. The calculator may consist of the electronic control unit 100, and the actuating unit 108 of control unit 100 may further transmit commands to actuating means for controlling the auto-adjustment. The height of each section 12 and 14 is corrected to reach the target height via the actuating means, for instance hydraulic cylinders. The height of each section 12 and 14 can be modified independently.

Although the present disclosure has been described in the foregoing description by way of illustrative embodiments thereof, these embodiments can be modified at will, within the scope of the appended claims without departing from the spirit and nature of the appended claims.

What is claimed is:

1. A system for controlling an inclination of a boom with respect to a vehicle, the boom having two sections, the system comprising:
    a central frame member pivotally mounted to the vehicle and receiving the two sections of the boom in such a manner that each of the two sections extends on a different side of the vehicle;
    at least one sensor for collecting data related to an inclination of the central frame member with respect to the vehicle;
    control means for controlling the inclination of the central frame member with respect to the vehicle; and
    an electronic control unit for actuating the control means based on the collected data.

2. The system of claim 1, wherein the control means comprises at least one of:
    breaking means for preventing a variation of the inclination of the central frame member; and
    adjustment means for modifying the inclination of the central frame member.

3. The system of claim 2, wherein the adjustment means comprises a pair of hydraulic cylinders.

4. The system of claim 3, wherein each hydraulic cylinder has an upper extremity secured to the central frame member and a lower extremity secured to the vehicle.

5. The system of claim 4, wherein the upper extremity of each hydraulic cylinder contains a fluid which can circulate from one upper extremity to the other upper extremity, wherein the circulation of the fluid modifies the inclination of the central frame member.

6. The system of claim 5, wherein the breaking means consist of a valve for allowing or preventing the circulation of the fluid, the valve being actuated by the electronic control unit.

7. The system of claim 4, wherein the lower extremity of each hydraulic cylinder contains a fluid which can circulate from one lower extremity to the other lower extremity, wherein the circulation of the fluid modifies the inclination of the central frame member.

8. The system of claim 7 further comprising a valve for allowing or preventing the circulation of the fluid, the valve being actuated by the electronic control unit.

9. The system of claim 4, wherein the lower extremity of each hydraulic cylinder contains a quantity of fluid which can be modified independently, wherein the modification of the quantity of fluid in the lower extremity of each hydraulic cylinder modifies the inclination of the central frame member.

10. The system of claim 9 further comprising at least one valve per hydraulic cylinder for independently controlling the quantity of fluid in the lower extremity of each hydraulic cylinder, the at least one valve being actuated by the electronic control device.

11. The system of claim 2, wherein the adjustment means comprises one double rod hydraulic cylinder and the breaking means comprises at least one valve for controlling a quantity of fluid in the double rod hydraulic cylinder.

12. The system of claim 1, wherein the collected data comprise data allowing a determination by the electronic control unit of the inclination of the central frame member with respect to the vehicle.

13. The system of claim 12, wherein determining the inclination of the central frame member with respect to the vehicle consists in determining the inclination of the central frame member with respect to another frame member attached to the vehicle, the central frame member and the other frame member being pivotally connected.

14. The system of claim 1 further comprising at least one sensor for collecting data allowing a determination that an auto-adjustment of the boom is occurring.

15. The system of claim 1, wherein the central frame member receiving the two sections of the boom consists in one of the following: the two sections are secured to the central frame member, and the two sections are integral to the central frame member.

16. A method for controlling an inclination of a boom with respect to a vehicle carrying the boom, the boom having two sections, the method comprising:
    allowing a pivotal movement of the boom with respect to the vehicle by means of a central frame member pivotally mounted to the vehicle and receiving each of the two sections of the boom in such a manner that each of the two sections extends on a different side of the vehicle;
    collecting data related to an inclination of the boom with respect to the vehicle;
    processing the collected data by means of an electronic control unit to generate commands for actuating control means; and
    actuating the control means for controlling the inclination of the boom with respect to the vehicle.

17. The method of claim 16, wherein controlling the inclination of the boom with respect to the vehicle comprises at least one of:
    preventing a variation of the inclination of the boom; and
    modifying the inclination of the boom.

18. The method of claim 17, wherein processing the collected data by means of an electronic control unit to generate commands for actuating control means comprises:
    determining a state of the boom; and
    based on the state of the boom, generating one of:
        a command for actuating the control means to prevent a variation of the inclination of the boom; or
        a command for actuating the control means to modify the inclination of the boom.

19. The method of claim 16, wherein the collected data comprise data allowing a determination by the electronic control unit of the inclination of the boom with respect to the vehicle.

20. The method of claim 16, wherein the collected data comprise data allowing a determination that an auto-adjustment of the boom is occurring.

* * * * *